United States Patent [19]

Jenkins, III et al.

[11] Patent Number: 4,956,427
[45] Date of Patent: Sep. 11, 1990

[54] PROCESS FOR REDUCING POLYMER BUILD-UP IN POLYMERIZATION EQUIPMENT DURING POLYMERIZATION OF ALPHA-OLEFINS

[75] Inventors: John M. Jenkins, III, S. Charleston, W. Va.; James D. McCullough, Jr., Houston, Tex.; Steven P. Sawin, Bridgewater, N.J.

[73] Assignee: Union Carbide Chemicals and Plastics Company Inc., Danbury, Conn.

[21] Appl. No.: 289,266

[22] Filed: Dec. 23, 1988

[51] Int. Cl.$^5$ .......................... C08F 2/34; F16L 58/04
[52] U.S. Cl. ........................................ 526/62; 526/74; 526/351; 427/387; 165/133
[58] Field of Search ..................... 526/62, 74, 351; 528/38; 427/387; 165/133, 134.1

[56] References Cited

U.S. PATENT DOCUMENTS

| | | | |
|---|---|---|---|
| 3,637,570 | 1/1972 | Stout | 528/38 X |
| 4,090,015 | 5/1978 | Koyanagi et al. | 526/62 |
| 4,427,034 | 1/1984 | Nagata et al. | 165/133 X |
| 4,464,516 | 8/1984 | Eberl et al. | 526/62 |
| 4,675,368 | 6/1987 | Bienfait et al. | 526/75 |

FOREIGN PATENT DOCUMENTS

| | | | |
|---|---|---|---|
| 0254234 | 1/1988 | European Pat. Off. | 526/74 |
| 0041386 | 4/1978 | Japan | 526/62 |

Primary Examiner—Edward J. Smith
Assistant Examiner—F. M. Teskin
Attorney, Agent, or Firm—Clement J. Vicari

[57] ABSTRACT

A method for the prevention of fouling of metallic surfaces exposed to reactive alpha-olefin gases during the production of polymeric resins which comprise coating such metallic surfaces with an amino silicone fluid and thereafter curing said coating by hydrolysis to form a continuous solid coating.

10 Claims, 1 Drawing Sheet

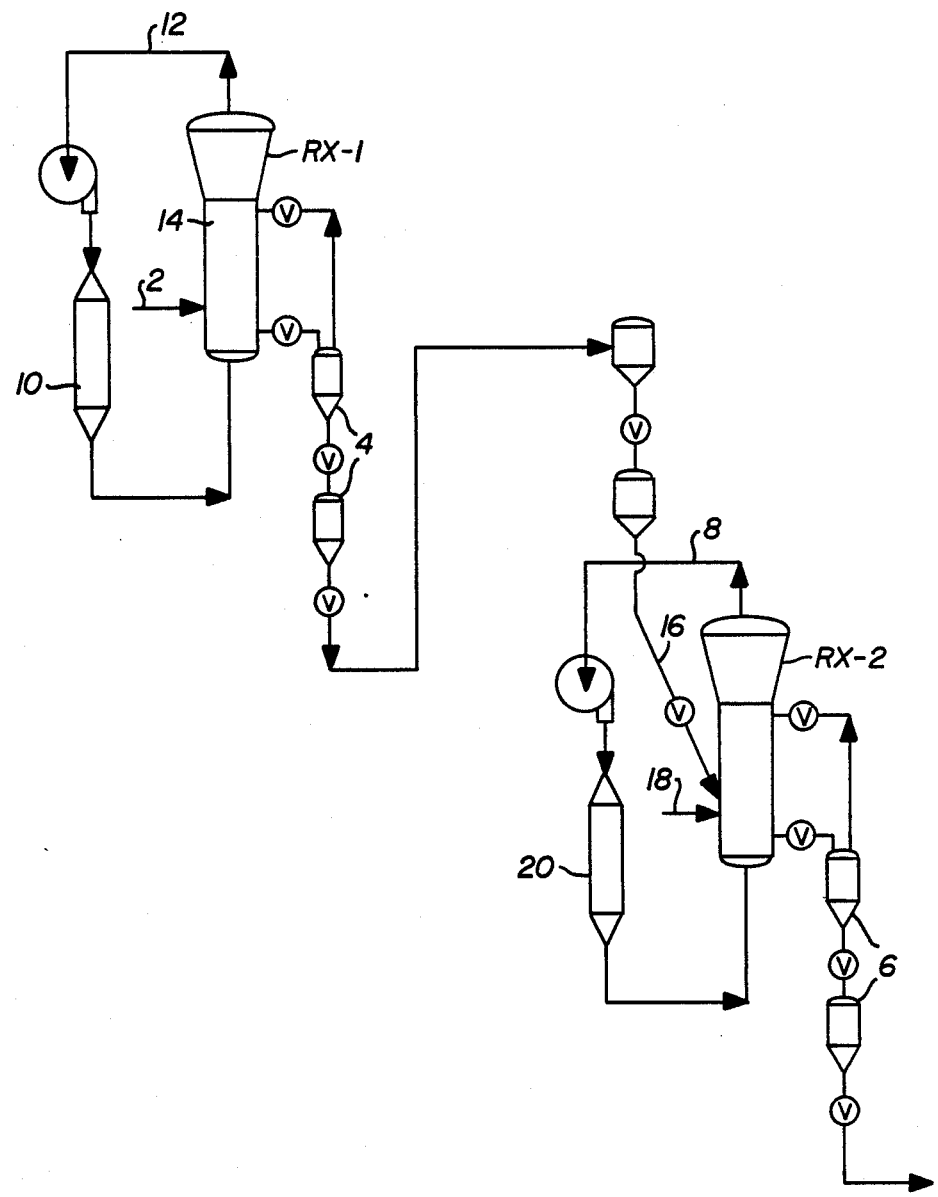

PROCESS FOR REDUCING POLYMER BUILD-UP IN POLYMERIZATION EQUIPMENT DURING POLYMERIZATION OF ALPHA-OLEFINS

BACKGROUND OF THE INVENTION

The invention relates to copolymerizing propylene and other alpha-olefins such as ethylene. More particularly, the present invention relates to a process for reducing the rate of heat exchanger fouling during copolymerization of propylene with alpha olefins such as ethylene.

Although the invention is herein described with reference to systems for copolymerization of propylene and ethylene, it will be understood that the invention can be readily applied to the copolymerization of other alpha-olefin monomer combinations such as propylene-butene, propylene-hexene and also terpolymer systems produced from three or more olefinic monomers.

"Propylene impact copolymers" are polymers which are composed of a polypropylene homopolymer phase which is intimately mixed with one or more ethylene-propylene copolymer phases. This mixture results in a product which has good impact resistance and good stiffness.

Impact copolymers are typically produced by two or more reactors in series. The first reactor typically produces polypropylene homopolymer which is then fed to a second reactor. Alternatively, the first reactor can be used to produce random copolymer which would then be fed to the second reactor. In the second reactor (and subsequent reactors, if any) the reactant composition is varied such that copolymers with varying fractions of ethylene and propylene are produced in each reactor and intimately mixed with the polymer from the previous reactors.

Typically, the reaction in the reactors which can be gas phase reactors is catalyzed by a transition metal catalyst. In most cases the transition metal is titanium.

In general, the equipment for producing propylene impact copolymers is conventional equipment such as two or more reactors, heat exchangers, compressors, discharge systems and piping connected to the various equipment.

Unfortunately, however, during normal operations, the surfaces of the tubes of the heat exchanger or cooler tend to foul with undesirable polymer deposits. These deposits tend to reduce the heat exchanger capability in cooling the recycled gas which removes the heat of reaction, and also it increases the pressure drop across the heat exchanger, which adds to the load on the cycle gas compressor. Because of increasing pressure drop and/or decreased heat exchanger capability the reactor must be shut down within a short time for cleaning.

SUMMARY OF THE INVENTION

It has been found that when the interior surface of the heat exchanger tubes are coated with a layer of an aminosilicone, the formation of polymer deposits can be reduced substantially, allowing extended reactor operation without the need for shut down to clean the heat exchanger.

Thus in a broad aspect the present invention provides a method for the prevention of of metallic surfaces exposed to reactive alpha-olefin gases during the production of polymeric resins which comprises coating said metallic surfaces with an amino silicone fluid of the general formula:

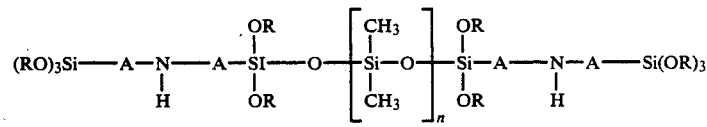

wherein:

each R is independently a lower alkyl of from 1 to 4 carbon atoms;

A is an alkylene group having from 2 to 6 carbon atoms; and n is a number ranging from about 5 to about 600 preferably about 10 to about 500, and thereafter said coating by hydrolysis to form a continuous solid coating.

BRIEF DESCRIPTION OF THE DRAWINGS

The sole FIGURE illustrates a two-reactor polymerization system for producing polypropylene impact copolymers.

DESCRIPTION OF THE PREFERRED EMBODIMENTS

The amino silicone fluids which are useful according to the invention are those of the general formula;

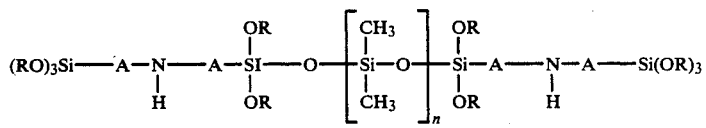

wherein:

each R is independently a lower alkyl of from 1 to 4 carbon atoms;

A is an alkylene group having from 2 to 6 carbon atoms; and n is a number ranging from about 5 to about 600 preferably about 10 to about 500.

The preferred aminosilicone fluids useful in the practice of this invention are those of the formula:

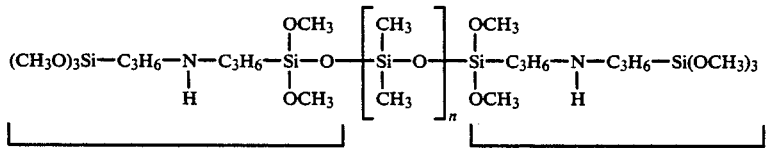

where n is as defined above. These amino silicone fluids are easily prepared by the reaction between a hydroxylterminated polymethylsiloxane and an appropriately substituted aminoalkyl trialkoxysilane, which in the case of the preferred aminosilicone fluids is amino propyl trimethoxysilane. The preferred aminosilicone fluids are available from several different commercial sources, among them being Union Carbide Corporation's product called UCAR Fluid AFL 40.

While the above formula indicates the presence of amino functionality only at the ends of the polyalkylsiloxane chain, it must be understood that internal amino groups may also be present if and to the extent that side reactions occur in which a single aminosilicone molecule reacts to join two hydroxyl terminated polymethylsiloxane reactants together in the course of the overall reaction. Neither the presence or absence of such internal amino functionality is believed to have any effect on the ability of the aminosilicone product to perform in accordance with the invention. Accordingly the generic formulae set forth above, as used herein include such aminosilicone fluids which contain internal amino functionality.

The amino silicone fluids employed in the practice of this invention all have terminal alkoxy, preferably methoxy groups, which are readily hydrolysable forming silanol groups which can then condense or cross-link to form a continuous solid coating on the metallic surfaces treated with aminosilicone liquid.

Recycled gas is preferably routed inside the heat exchanger tubes and cooled water or other cooling media is outside the tubes.

The amino silicone coating can be applied to the interior surfaces of the tubes of the heat exchanger in a variety of ways. Thus, the amino silicone can be sprayed, brushed, dipped, flooded and the like. A particularly preferred technique is to pull a soaked porous flexible material i.e., a material which has absorbed the amino silicone, through the tubes to be treated. Prior to application of the coating material to the inner surfaces of the tubes of the heat exchanger, it is preferred that the interior surfaces of tubes be cleaned which can be accomplished by a variety of conventional techniques with hydroblasting being the preferred technique.

In a preferred technique, the amino silicone is applied to the metallic surface in an appropriate solvent. It has been found that application of amino silicone diluted with about 50% of an appropriate solvent, such as hexane, provides acceptable interlayer adhesion and a potentially more uniform coating. Any solvent which is inert to the reaction which is to take place can be utilized such as isopentane, hexane, higher molecular weight alkane or mineral spirits.

The amount of coating applied, or the thickness thereof, is not particularly critical. However, for economic reasons, as thin a coating as possible should be applied to the surfaces to be protected while still insuring complete coverage. Again, it should be borne in mind that in addition to coating the interior surfaces or walls of the heat exchanger tubes other parts of the reaction system can if desired be coated, such as piping, compressor parts, reactor walls, baffles, agitator shaft and blades, heating coils, temperature probes, and the like. Suffice it to say that a sufficient amount of coating should be employed to obtain a continuous film over all interior surfaces of the heat exchanger tubes with no areas of said surfaces remaining unprotected. The coating can then be cured by passing moist air through the tubes for several hours while heating.

The curing results from the fact that the amino silicone contains residual alkoxy groups e.g. methoxy groups which are subject to hydrolysis. The silanol groups produced by this reaction can then condense. The following generally depicts the reaction responsible for cross-linking the polymer containing methoxy groups;

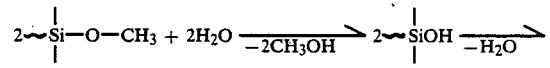

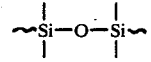

After application of the coating on the interior surfaces of the tubes of the heat exchanger and curing, the reaction to be carried out in the equipment may be commenced immediately, no particular modification of processing techniques being required due to the presence of the coating. Further, utilization of the internally coated tubes of the present invention does not adversely affect the heat stability or other physical and chemical properties of the polymers produced therein. Ordinary care should, of course, be exercised to avoid rough, physical contact with the coated surfaces because of the damage to the film which may result from such contacts.

Referring to FIG. 1, two reactor systems of the type illustrated in FIG. 1 typically provide a catalyzed exothermic reaction (e.g, a fluidized bed 14) within a first reactor RX-1 for converting gaseous raw materials into solid product. The coating tubes of the heat exchanger can be cleaned if desired by hydroblasting as explained previously and the aminosilicone coating was applied to the internal surfaces of the tubes by a porous flexible material. Raw materials (such as propylene, ethylene, nitrogen, hydrogen, catalyst, cocatalyst and a selectivity control agent) are fed through an input stream 2 to the reaction system (RX-1). The heat of reaction is removed from the reactor RX-1 by circulating a stream of gaseous raw materials 12 through a cooler 10. Reaction temperature may be controlled by adjusting water flow in cooler 10 which removes heat from the circulating gas stream 12. Solid product, in the form of polypropylene homopolymer or random copolymer containing active catalyst, is removed from reactor (RX-1) by periodically discharging a small portion of the fluidized bed 14 into a product discharge system 4.

The second reactor (RX-2) of the two reactor system of FIG. 1 is designed to produce a copolymer of propylene and ethylene in intimate mixture with the solid homopolymer or random copolymer material produced by the first reactor (RX-1). In this embodiment, the product stream 16 from the first reactor (RX-1) (including e.g., homopolymer and active catalyst) is fed to the second reactor (RX-2). Raw materials (e.g., ethylene and propylene) are fed via input stream 18 to the second reactor (RX-2) to be polymerized by the still active catalyst in the homopolymer or random copolymer material within the reactor (RX-1) product stream 16.

In the second reactor (RX-2), ethylene and propylene are copolymerized in intimate mixture with the propylene homopolymer or random copolymer to produce impact copolymer. The process is maintained by the addition of ingredients from RX-1 and input stream 18 and cooling is provided by the circulation of the gaseous stream 8 through a cooler 20.

In the embodiment of FIG. 1, no catalyst is added to RX-2. The reaction within RX-2 is thus catalyzed entirely by catalyst contained in the polymer coming from RX-1.

Typical objectives for the operation of a second or subsequent reactor RX-2 in a multi reactor chain process such as shown in FIG. 1 include maintaining prescribed values for the fraction (hereinafter called "$F_c$") of the final product (e.g., impact polypropylene) that is created in the second reactor and for the fraction (hereinafter called "$E_c$") of ethylene contained in the copolymer fraction which is produced in reactor RX-2.

$F_c$ (the fraction of total product that is created in the second reaction (RX-2) depends in general upon the combination of partial pressures of propylene ($C_3H_6$, hereinafter "C3") and ethylene ($C_2H_4$), hereinafter "C2") that exist in the reaction system RX-2. With some catalyst systems, however, catalyst or cocatalyst may be added to the second reactor to control $F_c$. $E_c$ (the fraction of ethylene that is incorporated in the copolymer produced in reactor RX-2) depends upon the relative partial pressures of ethylene and propylene.

During normal operations the internal surface of the tubes of the heat exchanger in the second stage during production of ethylene-propylene copolymer products tend to foul with undesirable polymer deposits. Application of the amino silicone coating to the internal surface of the tubes of the heat exchanger provides dramatic relief from fouling. The following examples will further illustrate the present invention.

In the Examples, one or more of the following materials were utilized and are identified as follows:

| | |
|---|---|
| UCAR Fluid AFL-40 | an amino silicone produced by Union Carbide Corporation |
| UCON AW-32 | a gear oil produced by Union Carbide Corporation |
| Formula SIC-520 | a phosphate containing detergent produced by Hunter Chemical Co. |
| WO-1 | a phosphoric acid based surfactant produced by Turco Products, Inc. |
| Zonyl-FSP | A fluorocarbon based surfactant produced by DuPont Co., Inc. Delaware |
| Tetronic 304 and 504 | Polyglycol amines produced by BASF-Wyandotte. |
| AS-196 | A liquid silicone type lubricating oil spray produced by Union Carbide Corporation. |
| M-416 | A liquid silicone spray mold release agent produced by IMS Blue Label. |

EXAMPLE 1

Impact copolymer polypropylene was produced in powder form in two gas phase fluidized bed reactors operated in series. In the second reaction system, a gas phase consisting of nitrogen was circulated prior to starting the polymerization. The gas was circulated by a cycle gas compressor through the tube side of a conventional shell and tube heat exchanger where heat was removed from the system. The insides of the heat exchanger tubes were cleaned prior to conducting the polymerization by hydroblasting and shell blasting to a smooth bare metal surface. No coating or treatment was applied. Four tubes were left uncleaned for comparison. Reaction was established by transferring homopolymer polypropylene containing active Ziegler-Natta polymerization catalyst from the first reactor to the second reactor; by feeding triethyl aluminum to the second reactor; and by establishing the proper concentration of ethylene, propylene, and hydrogen in the gas phase of the second reactor.

Triethylaluminum feed rate and gas phase composition were adjusted to produce an impact copolymer product having and $E_c$ (ethylene content of the copolymer) of approximately 60% and an $F_c$ (fraction copolymer) of approximately 18%. At the beginning of the run, the heat exchanger pressure drop was 5.7 psi.

The reactor was operated for 9 days producing impact copolymer with an $F_c$ of about 18%, one day with an $F_c$ of about 21% and three days with an $F_c$ of about 14.5%.

After 13 days, the second reactor was shut down in order to switch the plant to the production of homopolymer polypropylene. At this time, the heat exchanger pressure drop had increased to 28 psi. The rate of pressure drop increase was 1.7 psi/day.

Upon inspection, the insides of the heat exchanger tubes were found to have thin continuous film of rubbery polymer that extended throughout each tube.

EXAMPLE 2

Prior to conducting a polymerization, the tube side of the heat exchanger of Example 1 was cleaned by hydroblasting. Before placing the reactor in operation, several tube surface treatments were applied:

1. Two (2) tubes were coated with a liquid silicone-type lubricating oil spray, AS-196.
2. Two (2) tubes were coated with a liquid silicone mold release agent, M-416.
3. Two (2) tubes were coated with UCON AW 32 gear oil.
4. Two (2) tubes were washed with 0.1 normal sodium hydroxide solution and then flushed with clear water.
5. Two (2) tubes were washed with 0.1 normal sodium hydroxide solution, flushed with clear water, and were then coated with a phosphate-containing detergent solution (Hunter Chemical Company detergent formula SIC-520).

The remaining 117 tubes were left untreated.

The reactor was started up as in Example 1 and operating conditions were adjusted to produce initially an impact copolymer product having an $E_c$ of approximately 60% and an $F_c$ of approximately 18%. At the beginning of this run, the heat exchanger pressure drop was 11.5 psi and the overall heat transfer coefficient was 220 Btu/hr. sq. ft. °F.

The reactor was operated for 7 days producing 18% $F_c$ impact copolymer and 3½ days producing 25% $F_c$ impact copolymer.

The cooler tubes had a thick (3/32 inch) film on them. The film was rough (almost blistery). Two of the cooler tubes were plugged.

There were several tube treatments tested during this run. The results of these treatments were:

A. Silicone oil and mold release agents. No effect.

B. 0.1 normal NaOH treatment. This treatment showed some effect. The fouling film was somewhat thinner and much smoother than the untreated tubes.

C. UCON AW 32 gear oil. This treatment also showed some improvement over the untreated and the 0.1 N NaOH treated tubes. The fouling was thinner and again was much smoother than the untreated tubes.

D. Surfactant-Hunter chemical formula SIC 520. The fouling was the thinnest of all tube treatments. On the outlet side for first foot from the exit, the fouling consisted of small spots of polymer. The inlet side after the first five inches had bare metal for approximately two feet. The remainder of these two tubes had a thin smooth continuous film.

EXAMPLE 3

Prior to conducting a polymerization in the second reactor, the tube side of the heat exchanger of Example 1 was cleaned by hydroblasting. However, in this case, the tubes were coated with a phosphate-containing detergent solution (Hunter Chemical Company detergent formula SIC 520). The reactor was then placed in operation to produce impact copolymer with an $F_c$ of about 14.5% for 1 day, 18% $F_c$ for 4 days and 21% $F_c$ for 3 days. After operation for 8 days, the reactor was shut down due to high pressure drop across the heat exchanger which had increased to 50.4 psi (an average rise of 5.36 psi/day).

Upon inspection, the inside of the heat exchanger tubes were found to be fouled with a 1/16 inch build-up that extended throughout the tubes length.

EXAMPLE 4

Prior to conducting a polymerization in the second reactor, the tube side of the heat exchanger of Example 1 was cleaned by hydroblasting. The tubes were then treated with the phosphate containing detergent (SIC-520) mentioned in Example 3. However, in this case, the tubes were treated by circulating detergent solution through the tubes for 2 hours at 45° C. Four tubes were treated with another detergent, i.e., WO-1.

Tube inserts 3 feet long were designed to fit inside the heat exchanger tubes. Inserts were placed inside six tubes. The inserts were treated before insertion as follows:

| Insert Material | Treatment |
| --- | --- |
| Carbon Steel | Zonyl-FSP (Fluoro Surfactant) |
| Copper Nickel | UCAR-AFL-40 (Amino Silicone) |
| Copper-Nickel | Amino-glycol (Tetronic 504) |
| Carbon Steel | WO-1 |
| Stainless Steel | Zonyl-FSP (Fluoro Surfactant) |
| Copper-Nickel | Amino-glycol (Tetronic 304) |

The reactor was then placed in operation to product impact-copolymer for 13.5 days, with 4.5 days on 14% $F_c$ products, 6.5 days on 18% $F_c$ product, and 2.5 days on 25% $F_c$ product. The reactor was then shut down in order to switch the plant to the production of homopolymer polypropylene. At this point the heat exchanger pressure drop had increased to 34.5 psi (an average of 2.1 psi/day). The heat transfer coefficient decreased from about 210 Btu/hr. sq. ft. °F. at the beginning of the run to about 110 Btu/hr. sq. ft. °F. at the end of the run. Upon inspection of the heat exchanger tubes, the following was observed.

| Tube Inserts Treatment | Appearance of Build-Up |
| --- | --- |
| Amino glycol (Tetronic 304) | Thin but rough coating |
| Amino glycol (Tetronic 504) | Thin but rough coating |
| WO-1 | Thin but rough coating |
| Zonyl-FSP (Carbon Steel) | Thin but rough coating |
| Zonyl-FSP (Stainless Steel | Thin but rough coating |
| Amino-silicone (UCAR-AFL-40) | Clean (Shiny) |

The heat exchanger tubes treated with the detergent SIC-520, were found to have a thin but rough coating at the inlet of the tubes. The coating appeared to get thicker about 4 to 6 inch into tubes. The outlet end of the tubes had an irregular pattern of "beady" build-up with some visible clean spots. The four heat exchanger tubes swabbed with detergent WO-1 were found to have similar build-up at the tube inlet; however, the outlet of the tubes were found to be much more heavily fouled with a continuous, rough rubbery layer.

EXAMPLE 5

Similar to previous example, prior to conducting polymerization in the second reactor, the heat exchanger tubes were cleaned by hydroblasting. The inside of 10 heat exchanger tubes were swabbed with amino-silicone (UCAR-AFL-40). Eight tube inserts (similar to those used in Example 4) were installed inside heat exchanger tubes. These inserts were treated as follows:

| Tube Insert (Material of Construction) | Treatment |
| --- | --- |
| Cu/Ni | Treated with UCAR-AFL-40 (from previous example) |
| Cu/Ni | Control (no treatment) |
| Cu/Ni | Zonyl FSA (Fluoro Surfactant) |
| Cu/Ni | WO1 (surfactant) |
| Cu/Ni | UCAR-AFL-40 (amino silicone) |
| CS | UCAR-AFL-40 (amino silicone) |
| CS | SIC-520 (detergent) |
| SS | UCAR-AFL-40 (amino |

| Tube Insert (Material of Construction) | Treatment |
|---|---|
| | silicone) -continued |

The reactor was started up as in Example 1 and operating conditions were adjusted to produce initially an impact copolymer with 14% $F_c$ for 7 days and 18% $F_c$ for another 4 days. The second reactor was then shutdown in order to switch the plant to the production of homopolymer polypropylene. At this time the heat exchanger pressure drop increased to 22.7 psi (at an average of 1.4 psi/day). The overall heat transfer coefficient had dropped from 190 Btu/hr. sq. ft. °F. to about 120 Btu/hr. sq. ft. °F. at the end of the run.

Upon inspection of the heat exchanger tubes, the following was observed:

Untreated tubes: These tubes had thin and rough build-up. However, the tubes were not completely coated.

Treated tubes: These tubes were treated by coating with UCAR-AFL-40. They were cleaner than the untreated tubes. They had a non-uniform, streaky build-up.

| Tube inserts: | |
|---|---|
| Treatment | Appearance |
| 1. Cu/Ni-Control | Continuous build-up. Similar to untreated tubes. |
| 2. Cu/Ni-WO1 | Continuous build-up. Similar to control. |
| 3. Cu/Ni-Zonyl FSP | Similar to 1 & 2 above. |
| 4. CS-SIC-520 Treated | Similar to control. |
| 5. Cu/Ni-UCAR-AFL-40 (treated in previous example) | Thin build up with streaks of clean areas Almost as coated as the control |
| 6. Cu/Ni-UCAR-AFL-40 Treated | Clean, shiny except for minor "beady" build-up in the middle. |
| 7. SS-UCAR-AFL-40 Treated | Partially clean on the ends. Some build-up in the middle. |
| 8. CS-UCAR-AFL-40 Treated | Had some build-up. It looked better than control. |

EXAMPLE 6

Prior to conducting polymerization in the second reactor, the tube side of the heat exchanger of Example 1 was cleaned by hydroblasting. Approximately ⅔ of the tubes were then treated with UCAR-AFL-40 by either pulling a soaked squeegee or blowing it through the tube. The reactor was then started up as in Example 1 to .make impact copolymer for 26 days (with 16 days on 14% $F_c$, 7.5 days on 18–21% $F_c$ and 2.5 days on 25% $F_c$) The reactor was then shutdown in order to switch the plant to the production of homopolymer polypropylene. At this time the heat exchanger pressure drop increased to only 22.6 psi (at an average of only 0.56 psi/day). The overall heat transfer coefficient dropped from about 170 to about 100 Btu/hr. sq. ft. °F. Upon inspection of the heat exchanger tubes, the following was observed:

Untreated tubes: The untreated tubes had a uniform coating similar to that of Example 1.

Treated tubes: The tubes treated with UCAR-AFL-40 were found to be much cleaner than untreated tubes with only spotty build-up of "beady" appearance.

What is claimed is:

1. A method for the prevention of fouling of metallic surfaces exposed to reactive alpha-olefin gases during the production of polymeric resins which comprise coating such metallic surfaces with an amino silicone fluid of general formula:

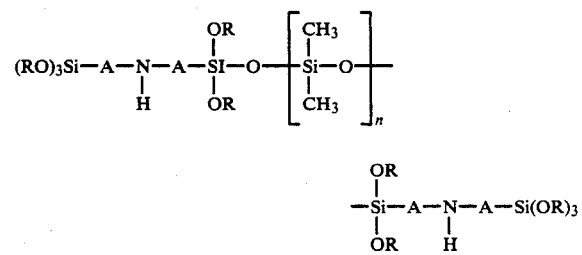

wherein:
each R is independently a lower alkyl of from 1 to 4 carbon atoms;
A is an alkylene group having from 2 to 6 carbon atoms; and
n is a number ranging from about 5 to about 600 and thereafter curing said coating by hydrolysis to form a continuous solid coating.

2. A method according to claim 1 wherein said metallic surfaces are elements of a heat exchanger.

3. A method according to claim 1, wherein said reactive gases are predominately ethylene or propylene or mixtures thereof.

4. A method according to claim 1 wherein coating is an essentially continuous cross-linked solid coating.

5. A method according to claim 1 wherein said amino silicone is applied to said metallic surfaces in an inert solvent.

6. A method according to claim 1 wherein n is from about 10 to about 500.

7. A method for inhibiting polymer agglomeration in heat exchangers during polymerization of alpha olefin gases which comprises applying an amino silicone coating material to the surface of said heat exchanger in contact with said polymer, and thereafter curing by hydrolysis said amino silicone coating to form a continuous solid coating, said amino silicone being used in an amount sufficient to inhibit polymer agglomeration.

8. A method according to claim 7 wherein said alpha olefin gases are ethylene and/or propylene.

9. A method according to claim 7 wherein said amino silicone is represented by the formula:

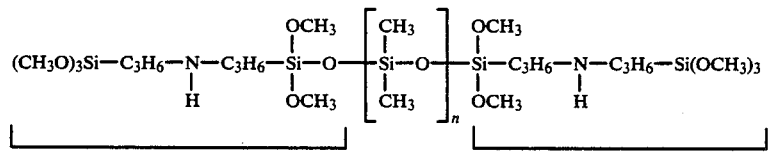
wherein:
n is a number ranging from about 5 to about 600 and thereafter curing said coating by hydrolysis to form a continuous solid coating.
10. A method according to claim 9 wherein n is from about 10 to about 500.
* * * * *